United States Patent [19]

Wilkinson

[11] Patent Number: 4,751,590
[45] Date of Patent: Jun. 14, 1988

[54] RECORDING AUDIO SIGNALS

[75] Inventor: James H. Wilkinson, Basingstoke, United Kingdom

[73] Assignee: Sony Corporation, Tokyo, Japan

[21] Appl. No.: 62,338

[22] Filed: Jun. 9, 1987

Related U.S. Application Data

[63] Continuation of Ser. No. 766,268, Aug. 16, 1985.

[30] Foreign Application Priority Data

Sep. 10, 1984 [GB] United Kingdom ............... 8422769

[51] Int. Cl.$^4$ ..................... G11B 20/12; H04N 5/782
[52] U.S. Cl. .................................... 360/19.1; 360/32; 360/38.1; 360/48; 358/343; 358/336
[58] Field of Search ....................... 360/19.1, 32, 38.1, 360/48; 358/343, 336; 371/39, 40

[56] References Cited

U.S. PATENT DOCUMENTS

| | | | |
|---|---|---|---|
| 4,224,642 | 9/1980 | Mawatari | 360/32 |
| 4,473,850 | 9/1984 | Foerster | 360/32 |
| 4,477,844 | 10/1984 | Nakano | 360/38.1 |
| 4,516,163 | 5/1985 | Masuda | 360/32 |
| 4,593,394 | 6/1986 | Tominitsu | 371/39 |

*Primary Examiner*—Alan Faber
*Attorney, Agent, or Firm*—Lewis H. Eslinger

[57] ABSTRACT

In a method of recording digital audio signals of four audio channels in association with a digital video signal in oblique tracks using a 4-head digital video tape recorder, the digital audio signals are assembled into error-correction blocks each comprising two audio data words and two error-correction code check words, each oblique track comprises in sequence first and second sectors at the beginning of the track, a central portion in which the video signals are recorded, and third and fourth sectors at the end of the track, the audio data words and the check words are distributed to the four heads to be recorded in the sectors, and the assembly, the error-correction code and the distribution are such that the four audio channels can be correctly reproduced even if, on reproduction, any two of the sectors are lost from each reproduced track, or any two of the four heads fail to supply a reproduced output.

9 Claims, 4 Drawing Sheets

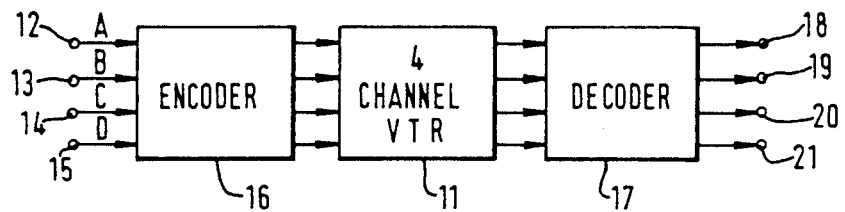
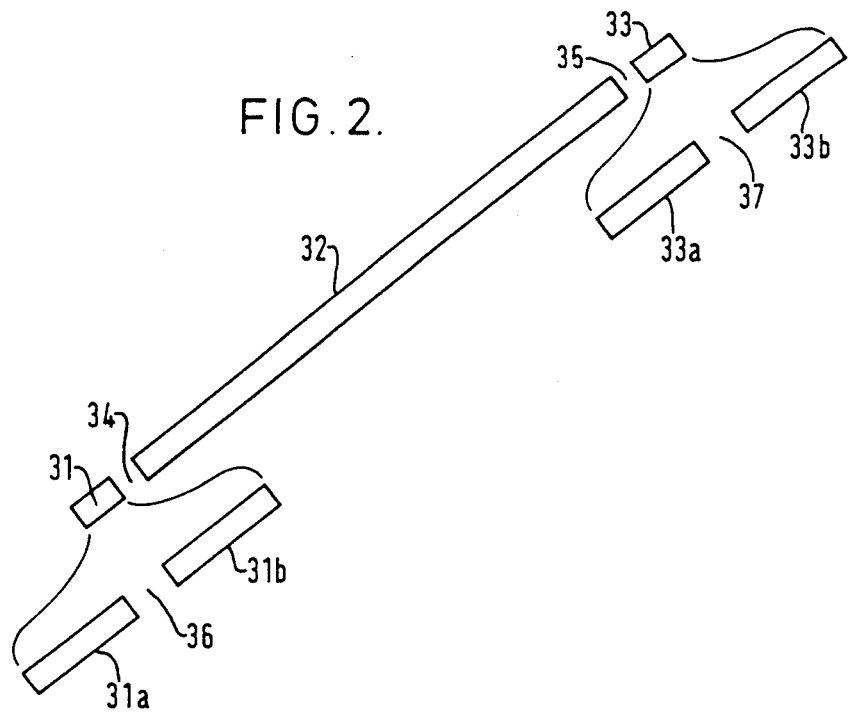

FIG. 4.

| | 33b | | | | | | | | |
|---|---|---|---|---|---|---|---|---|---|
| | S1 | 22 | S1 | 23 | S1 | 24 | S1 | 21 |
| | S1 | 18 | S1 | 19 | S1 | 20 | S1 | 17 |
| | b4 | 14 | c4 | 15 | d4 | 16 | a4 | 13 |
| | B4 | 10 | C4 | 11 | D4 | 12 | A4 | 9 |
| | S1 | 6 | S1 | 7 | S1 | 8 | S1 | 5 |
| | S1 | 2 | S1 | 3 | S1 | 4 | S1 | 1 |

| | 33a | | | | | | | | |
|---|---|---|---|---|---|---|---|---|---|
| | S0 | 23 | S0 | 24 | S0 | 21 | S0 | 22 |
| | S0 | 19 | S0 | 20 | S0 | 17 | S0 | 18 |
| | c3 | 15 | d3 | 16 | a3 | 13 | b3 | 14 |
| | C3 | 11 | D3 | 12 | A3 | 9 | B3 | 10 |
| | S0 | 7 | S0 | 8 | S0 | 5 | S0 | 6 |
| | S0 | 3 | S0 | 4 | S0 | 1 | S0 | 2 |

| | 31b | | | | | | | | |
|---|---|---|---|---|---|---|---|---|---|
| | d6 | 24 | a6 | 21 | b6 | 22 | c6 | 23 |
| | D6 | 20 | A6 | 17 | B6 | 18 | C6 | 19 |
| | S1 | 16 | S1 | 13 | S1 | 14 | S1 | 15 |
| | S1 | 12 | S1 | 9 | S1 | 10 | S1 | 11 |
| | d2 | 8 | a2 | 5 | b2 | 6 | c2 | 7 |
| | D2 | 4 | A2 | 1 | B2 | 2 | C2 | 3 |

SECTOR →

| | 31a | | | | | | | | |
|---|---|---|---|---|---|---|---|---|---|
| | a5 | 21 | b5 | 22 | c5 | 23 | d5 | 24 |
| | A5 | 17 | B5 | 18 | C5 | 19 | D5 | 20 |
| | S0 | 13 | S0 | 14 | S0 | 15 | S0 | 16 |
| | S0 | 9 | S0 | 10 | S0 | 11 | S0 | 12 |
| | a1 | 5 | b1 | 6 | c1 | 7 | d1 | 8 |
| | A1 | 1 | B1 | 2 | C1 | 3 | D1 | 4 |

HEAD → 1  2  3  4

FIG. 6.

| 33b | b6 | 22 | c6 | 23 | d6 | 24 | a6 | 21 |
|---|---|---|---|---|---|---|---|---|
|  | B6 | 18 | C6 | 19 | D6 | 20 | A6 | 17 |
|  | b4 | 14 | c4 | 15 | d4 | 16 | a4 | 13 |
|  | B4 | 10 | C4 | 11 | D4 | 12 | A4 | 9 |
|  | b2 | 5 | c2 | 7 | d2 | 8 | a2 | 5 |
|  | B2 | 2 | C2 | 3 | D2 | 4 | A2 | 1 |

| 33a | c5 | 23 | d5 | 24 | a5 | 21 | b5 | 22 |
|---|---|---|---|---|---|---|---|---|
|  | C5 | 19 | D5 | 20 | A5 | 17 | B5 | 18 |
|  | c3 | 15 | d3 | 16 | a3 | 13 | b3 | 14 |
|  | C3 | 11 | D3 | 12 | A3 | 9 | B3 | 10 |
|  | c1 | 7 | d1 | 8 | a1 | 5 | b1 | 6 |
|  | C1 | 3 | D1 | 4 | A1 | 1 | B1 | 2 |

| 31b | d6 | 24 | a6 | 21 | b6 | 22 | c6 | 23 |
|---|---|---|---|---|---|---|---|---|
|  | D6 | 20 | A6 | 17 | B6 | 18 | C6 | 19 |
|  | d4 | 16 | a4 | 13 | b4 | 14 | c4 | 15 |
|  | D4 | 12 | A4 | 9 | B4 | 10 | C4 | 11 |
|  | d2 | 8 | a2 | 5 | b2 | 6 | c2 | 7 |
|  | D2 | 4 | A2 | 1 | B2 | 2 | C2 | 3 |

| 31a | a5 | 21 | b5 | 22 | c5 | 23 | d5 | 24 |
|---|---|---|---|---|---|---|---|---|
|  | A5 | 17 | B5 | 18 | C5 | 19 | D5 | 20 |
|  | a3 | 13 | b3 | 14 | c3 | 15 | d3 | 16 |
|  | A3 | 9 | B3 | 10 | C3 | 11 | D3 | 12 |
|  | a1 | 5 | b1 | 6 | c1 | 7 | d1 | 8 |
|  | A1 | 1 | B1 | 2 | C1 | 3 | D1 | 4 |

SECTOR →

HEAD → 1　2　3　4

RECORDING AUDIO SIGNALS

This is a continuation of application Ser. No. 766,268, filed 8-16-85.

BACKGROUND OF THE INVENTION

1. Field of the Invention

This invention relates to methods of recording audio signals, and more particularly to methods of recording digital audio signals in association with digital video signals using a digital video tape recorder (VTR).

2. Description of the Prior Art

There is a requirement to provide four channels of digital audio signal in association with a digital video signal, and it is known to record digital audio signals in oblique tracks on a magnetic tape together with digital video signals using a digital VTR. However, this method can result in problems if errors are present on reproduction of the digital audio signals due, for example, to physical damage to the magnetic tape or clogging of a reproducing head.

SUMMARY OF THE INVENTION

One object of the present invention is to provide a method of recording digital audio signals in which these problems are alleviated.

Another object of the present invention is to provide a method of recording digital audio signals using a 4-head digital video tape recorder, each head recording an oblique track comprising four audio sectors and a video portion, and wherein complete reproduction is possible even if two of the heads fail to reproduce.

Another object of the present invention is to provide a method of recording digital audio signals using a 4-head digital video tape recorder, each head recording an oblique track comprising four audio sectors and a video portion, and wherein complete reproduction is possible even if the same two sectors from each track are not reproduced.

According to the present invention there is provided a method of recording digital audio signals of four audio channels in association with a digital video signal in oblique tracks on a magnetic tape using a 4-head digital video tape recorder, wherein:

said digital audio signals are assembled into error-correction blocks each comprising a plurality of audio data words and an equal plurality of error-correction check words;

each said track comprises four audio sectors and a video portion or portions in which said video signals are recorded;

said audio data words and said check words are distributed to said heads to be recorded in said audio sectors; and said assembly, said error-correction and said distribution are such that said four audio channels can be correctly reproduced even if, on reproduction, any two of said audio sectors are lost from each reproduced said track, or any two of said heads fail to supply a reproduced output.

The above, and other objects, features and advantages of this invention will be apparent from the following detailed description of illustrative embodiments which is to be read in conjunction with the accompanying drawings.

BRIEF DESCRIPTION OF THE DRAWINGS

FIG. 1 shows in block form apparatus for recording digital audio signals;

FIG. 2 shows diagrammatically an oblique track recorded on a magnetic tape;

FIG. 4 shows the distribution of audio data words to four heads of a VTR for recording;

FIG. 6 shows an alternative distribution of audio data words to four heads of a VTR for recording.

DESCRIPTION OF THE PREFERRED EMBODIMENTS

Figure 3:
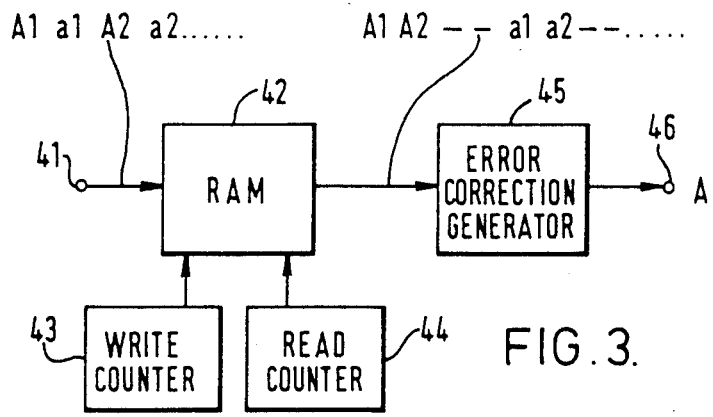
FIG. 3 shows in somewhat more detailed block form part of the apparatus of FIG. 1.

It is now sometimes specified that a digital VTR must, in addition to being able to record a digital video signal, also be able to record four channels of digital audio signal associated with the video signal. For example, where the video signal relates to a spectator sport, the four audio channels may carry a commentary, left and right stereophonic crowd sounds, and sounds from a microphone directed towards the area of action. Each audio signal is sampled and pulse code modulation coded to form 16-bit audio data words, which are normally divided into pairs of 8-bit audio data wrods prior to recording, for conformity with the 8-bit video data words formed by coding video samples, and so that common circuitry can be used for processing the 8-bit audio and video data words.

It has been proposed to record audio data words in blocks at the beginning or the end of each oblique track of recorded video data on a magnetic tape. However, there is a problem with this method, which is that if the magnetic tape is physically damaged, for example by a longitudinally extending scratch, or if one of a plurality of recording and/or reproducing heads of the digital VTR becomes clogged, then all, or at least a very large proportion of the data words corresponding to one audio channel may be lost or corrupted. In such a case, even although error correction techniques may be used, it may still not be possible to reproduce satisfactorily the audio signal corresponding to that channel.

FIG. 1 shows in block form apparatus for use in a method according to the present invention for recording audio signals of four channels in association with a digital video signal, using a 4-head digital VTR 11. The four audio signals are supplied from input terminials 12 to 15 respectively to the digital VTR 11 by way of an encoder 16 in which each of the audio signals is sampled and pulse code modulation codes in known manner to form 16-bit digital audio data words. Each of these 16-bit audio data words is split into two 8-bit audio data words respectively comprising the eight most and least significant bits of the respective 16-bit audio data word. 8-bit error-correction check words are then added to the 8-bit audio data words and the resulting audio data words and check words are distributed to four channels for recording by four recording and reproducing heads respectively of the digital VTR 11. On reproduction, the four recording and reproducing heads supply the reproduced audio data words and check words over four channels to a decoder 17 where, after error correction, the reproduced audio data words are decoded to form four output audio signals corresponding respectively to the four input audio signals for supply to output terminals 18 to 21.

FIG. 2 shows diagrammatically an oblique track recorded by one head of the digital VTR 11. The oblique track comprises an audio portion 31 at the beginning of the scan, a video portion 32 in the centre of the scan, and a second audio portion 33 at the end of the scan. At least between the portions 31 and 32, and 32 and 33 are edit gaps 34 and 35 respectively, to permit independent editing of the audio and video signals. Each of the audio portions 31 and 33 comprises two sectors 31a and 31b, and 33a and 33b.

The four heads of the VTR 11 record four such oblique tracks simultaneously in each scan, and the video portions 32 of twelve successive oblique tracks, three recorded by each head of the VTR 11, comprise the video data words for one field of a 625-line 50-field per second television signal.

Referring to FIG. 3, the incoming 16-bit audio data words of one channel A of the four video channels, which will herein be designated A, B, C and D, will be considered. The 16-bit audio data words are supplied by way of an input 41 and may be thought of as successive groups of 162 16-bit audio data words. By further considering the split of each of these words into two 8-bit audio data words comprising the most and least significant parts of a 16-bit audio data word, the group consists of 324 8-bit audio data words which will be designated A1, a1, A2, a2, . . . , A162, a162. The two parts of any given 16-bit audio data word bear the same number and the upper and lower case letters refer to the most and least significant bits respectively. These 8-bit audio data words are stored in a small random access memory (RAM) 42 having associated with it write and read counters 43 and 44. The RAM 42 is controlled by the counters 43 and 44 such that the stored 8-bit audio data words are read out at twice the incoming rate, are rearranged in alternating pairs each consisting of two successive most or least significant parts, and are separated by pairs of gaps. Thus, the read-out sequence is A1, A2, gap, gap, a1, a2, gap, gap, . . . This sequence is supplied to an error-correction check word generator 45 which, for each pair of 8-bit audio data words A1, A2; a1, a2; A3, A4; . . . generates a pair of 8-bit double-erasure error correcting code check words S0 and S1 using a known Reed Solomon error correcting code. Each pair of audio data words with the associated pair of check words forms an outer error-correction block and, in associated with an inner error-detection block operative to flag words which may be in error, is able perfectly to correct the pair of audio data words if any two of the four words of the outer error-correction block are reproduced correctly. The sequence supplied to an output terminal 46 is therefore A1, A2, S0, S1, a1, a2, S0, S1, . . . where each pair of check words S0 and S1 relates to the immediately preceding pair of audio data words. Identical processing is applied to the audio data words in the other three channels B, C and D.

FIG. 4 shows how the audio data words and associated outer block error-correction check words are to be distributed among the four heads 1, 2, 3 and 4 of the VTR 11 for recording on the tape and also how these words are distributed among the sectors 31a, 31b, 33a and 33b in the oblique tracks. Each open-ended rectangle in FIG. 4 indicates a sector, and four vertically aligned rectangles represent the sectors recorded by a single head 1, 2, 3 or 4 in a single scan. Four horizontally aligned rectangles represent the sectors recorded by the four heads 1 to 4 respectively of the VTR 11 in a single scan of the tape by the head assembly.

Within each rectangle are indicated the first six of the 324 audio data words and outer block error-correction check words recorded in the complete sector, and the sequence for the remainder of that sector will be apparent. The numbers to the right of each rectangle represent the outer error-correction block to which the adjacent word belongs. Thus, for example, outer error-correction block 1 consisting of the audio data words and check words A1, A2, S0 and S1 is distributed in the first position in each of the sectors 31a, 31b, 33a and 33b respectively recorded by the heads 1 to 4. The distributions of the audio data words and check words of the other outer error-correction blocks follow cyclically and will likewise be apparent.

It is important to note that as a consequence of this distribution, loss of any two of the four sectors 31a, 31b, 33a and 33b in which the audio data words and check words of any given outer error-correction block are recorded, as a result, for example, of damage to the tape, still enables the two audio data words to be reproduced perfectly after correction. As these two audio datw words form part of the same 16-bit audio data word, the corresponding audio sample can be reproduced perfectly. Likewise, it will be seen that if the output from any two of the heads 1 to 4 is lost, for example as a result of those heads becoming clogged, it is again still possible to reproduce the audio samples perfectly.

Moreover, if any three of the sectors 31a, 31b, 33a and 33b are lost, or if any three of the heads 1 to 4 fail to reproduce the signals, the samples which are reproduced are equally distributed between the four channels A to D, and in fact comprise every fourth sample in each of the four channels A to D.

It should further be noted that with this distribution, each of the sectors 31a, 31b, 33a and 33b consists only of audio data words and associated outer block error-correction check words relating to a given one of the channels A, B, C or D. This means that it is possible to edit any one of the audio channels A, B, C or D individually by replacing complete sectors 31a, 31b, 33a and 33b. To facilitate such editing of individual channels A to D, it is preferable to insert further edit gaps 36 and 37 between the sectors 31a and 31b and 33a and 33b, respectively, as shown in FIG. 2.

The 324 audio data words and outer block error-correction check words recorded in each of the sectors 31a, 31b, 33a and 33b are divided into six inner error-detection blocks. Five of these blocks comprise 56 audio data words and the sixth of these blocks comprises 44 audio data words, so that the number of audio data words in each of the blocks is divisible by four. Each of these blocks is made up to 60 words by adding synchronization and auxiliary data, and to the 60-word block is added six error-detection words, for example in the form of a cyclic redundancy check code. Then, as each inner error-correction block is reproduced, the cyclic redundancy check code is used to check the reproduced audio data words and outer block error-correction check words for error, and if any error is detected then all the audio data words and outer block error-correction check words in that inner error-detection block are flagged as being in error. Then, at the next stage, the outer block error-correction check words are used to correct any one or two of the words in an outer error-correction block which are flagged as being in error.

Figure 5:
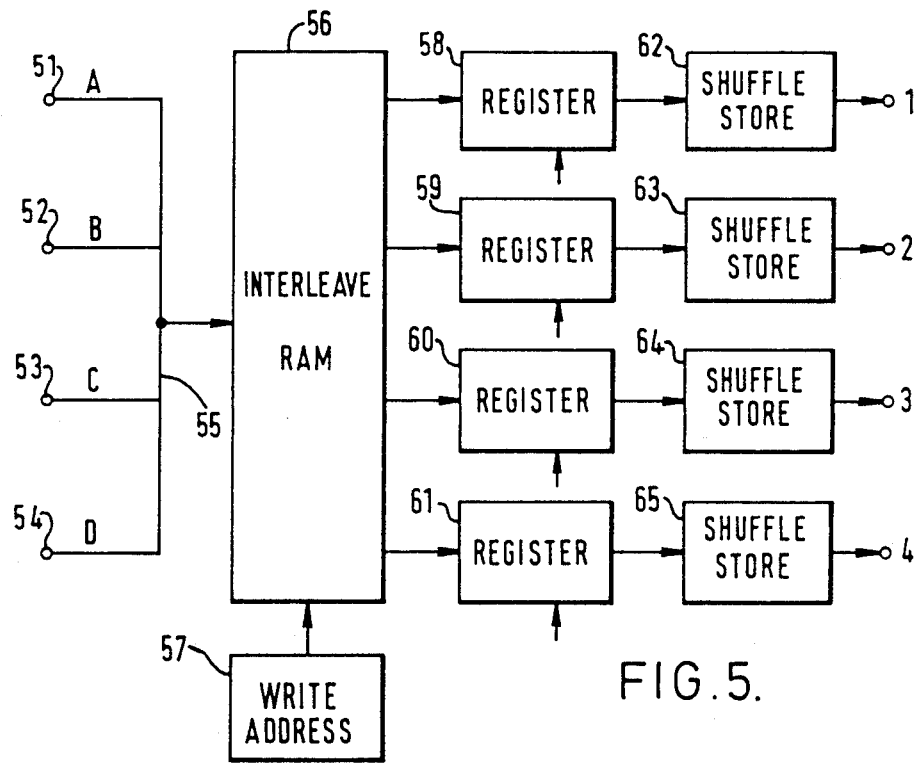
FIG. 5 shows in somewhat more detailed form another part of the apparatus of FIG. 1.

One form of apparatus for distributing the output from the circuit of FIG. 3 will now be described with reference to FIG. 5. It is to be remembered that a circuit as shown in FIG. 3 is provided for each of the channels A to D, and the outputs of these four circuits are supplied to inputs 51 to 54 of the circuit of FIG. 5. The words in the channels A to D are conveniently multiplexed by connecting the input terminals 51 to 54 to a tri-state bus 55 and thence to an interleave RAM 56 which has a write address control 57. The words are read from the interleave RAM 56 into four registers 58 to 61 which are controlled by respective differently phased clock signals so that each register 58 to 61 latches the data corresponding to a given head 1, 2, 3 or 4 of the VTR 11. The interleaved words then pass to respective shuffle stores 62 to 65, each of which comprises a RAM, and in which the words to be recorded by the respective one of the heads 1 to 4 is shuffled in known manner over the required distance. In general, that distance is one head scan, although it may be some different distance, such as one field. At this stage the cyclic redundancy check words for the inner error-detection blocks are formed and the words, which are then distributed as indicated in FIG. 4, are supplied to the heads 1 to 4 for recording on the magnetic tape. On reproduction from the magnetic tape, the procedure is the inverse of that described above, so that errors are detected using the inner error-detection block cyclic redundancy check code, errors are corrected using the outer block error-correction check words, the 8-bit audio data words are re-distributed to the original channels A to D, the 16-bit audio data words are re-formed, the audio samples are reformed, and hence the original audio signals corresponding to the audio channels A to D are re-formed.

It is to be noted that not all the audio data words need correspond to actaul data, as some dummy words may be included to ease synchronization problems.

Referring back to FIG. 2, the arrangement of the sectors 31a, 31b, 33a and 33b in the oblique track may be modified. For example, the video portion 32 may be split in half and the two sectors 33a and 33b interposed therein, so the sequence becomes audio portion 31, video portion (half of 32), audio portion 33, video portion (other half of 32). Alternatively, the audio portions 31 and 33 may be grouped together, but as this makes them more vulnerable in the case of physical damage to the magnetic tape, an arrangement in which the audio portions 31 and 33 are distributed or spaced in the oblique track is preferred. Moreover, the number of words recorded in each of the sectors 31a, 31b, 33a and 33b may be changed, in particular where the method is used for a television signal corresponding to a different television system.

Other forms of error-correction can be used for the outer error-correction blocks. One very simple alternative which may be advantageous to use in cases where reproduction in high speed modes is likely to occur, uses mere repetition of the two 8-bit audio data words in the outer block. In this case the sequence supplied to the output terminal 46 in FIG. 3 becomes A1, A2, A1, A2, a1, a2, a1, a2, ..., and the distribution of the audio data words and associated outer block error-correction check words (repeated audio data words) becomes as shown in FIG. 6.

Finally, the precise method of distributing the words between the sectors 31a, 31b, 33a and 33b, and the heads 1 to 4, may be varied.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of recording digital audio signals of four audio channels in association with a digital video signal in oblique tracks on a magnetic tape using a 4-head digital video tape recorder, wherein:
   said digital audio signals are assembled into error-correction blocks each comprising a plurality of audio data words and a plurality of error-correction check words;
   choosing said error correction check words and forming said error-correction blocks to correct audio data word errors if any two of four words of the error correction block are reproduced incorrectly;
   each said track comprises four audio sectors and at least one video portion in which said video signals are recorded;
   interleaving and distributing said audio data words and said check words formed as said error-correction blocks among said heads to be recorded in said audio sectors; and
   said assembly, said error-correction and said distribution are such that said four audio channels can be correctly reproduced even if, on reproduction, any two of said audio sectors are lost from each reproduced said track, or any two of said heads fail to supply a reproduced output.

2. A method according to claim 1 wherein each said track comprises in sequence first and second said audio sectors adjacent to the beginning of said track, a central portion in which said video signals are recorded, and third and fourth said audio sectors adjacent to the end of said track.

3. A method according to claim 1 wherein said plurality of audio data words and said plurality of error-correction check words are both equal to two and said distribution is such that each of the four said audio data words and error-correction code check words in any given said error-correction block is recorded by a different one of said four heads of said digital video tape recorder.

4. A method according to claim 1 wherein said error-correction check words are formed using a Reed Solomon error correcting code.

5. A method according to claim 1 wherein the audio signal in each of said four audio channels is sampled and pulse code modulation coded into 16-bit audio data words, and wherein the step of assembling the digital audio signals into error correction blocks includes the steps of splitting each said 16-bit audio data word into two 8-bit audio data words comprising, respectively, the most and least significant bits of a 16-bit audio data word, and recording said two 8-bit audio data words in the same audio sector.

6. A method according to claim 1 wherein said audio data words and said check words to be recorded in each said sector are assembled into error-detection blocks each comprising a plurality of said audio data words and an equal plurality of said check words, and a plurality of error-detection code check words are associated with each said error-detection block.

7. A method according to claim 6 wherein said error-detection code check words are formed using a cyclic redundancy check code.

8. A method according to claim 1 wherein said assembly, said error-correction and said distribution are such that at least every fourth audio sample corresponding to each of said four audio channels can be correctly reproduced even if, on reproduction, any three of said sectors are lost from each reproduced said track, or any three of said heads fail to supply a reproduced output.

9. A method according to claim 1 wherein the step of assembling said error-correction blocks includes providing the plurality of audio data words and the plurality of error-correction check words to be equal.

* * * * *